United States Patent [19]

Ester

[11] Patent Number: 5,154,001
[45] Date of Patent: Oct. 13, 1992

[54] TOOL AND METHOD FOR ESTABLISHING AN ARROW'S BALANCE POINT

[76] Inventor: Lee Ester, 4627 W. Elgin St., Chandler, Ariz. 85226

[21] Appl. No.: 867,896

[22] Filed: Apr. 13, 1992

[51] Int. Cl.⁵ .......................... G01B 1/00; G01M 1/12
[52] U.S. Cl. ....................................... 33/506; 33/520; 73/65
[58] Field of Search ................ 73/65, 456; 273/77 R, 273/77 A, 416; 29/1.2; 33/501, 506, 520, 644

[56] References Cited

FOREIGN PATENT DOCUMENTS 381729 6/1932 United Kingdom .................... 73/65

Primary Examiner—Harry N. Haroian
Attorney, Agent, or Firm—James F. Duffy

[57] ABSTRACT

An arrow balancing tool is used in establishing the optimal balance point on an arrow to produce the most efficient flight characteristics in accord with manufacturer recommendations. Assuming that the optimal balance point will fall toward the nose end of the arrow, approximately 7 to 10% of the arrow length removed from the midpoint of the arrow, the invention provides a base with a scale graduated in units equivalent to 57% of the length of the arrows being balanced. A second scale is graduated in units representative of 60% of the lengths of the various arrows to be balanced. A reference point, zero on the various scales, is established at which the nock of the arrow is positioned. A fulcrum, slidingly coupled to the tool, is adjusted until the balance point of the arrow is determined. Indices on the sliding fulcrum are positioned for a readout on each of the scales. Actual scale values reflect current manufacturer recommendations for optimal balance of an arrow.

14 Claims, 2 Drawing Sheets

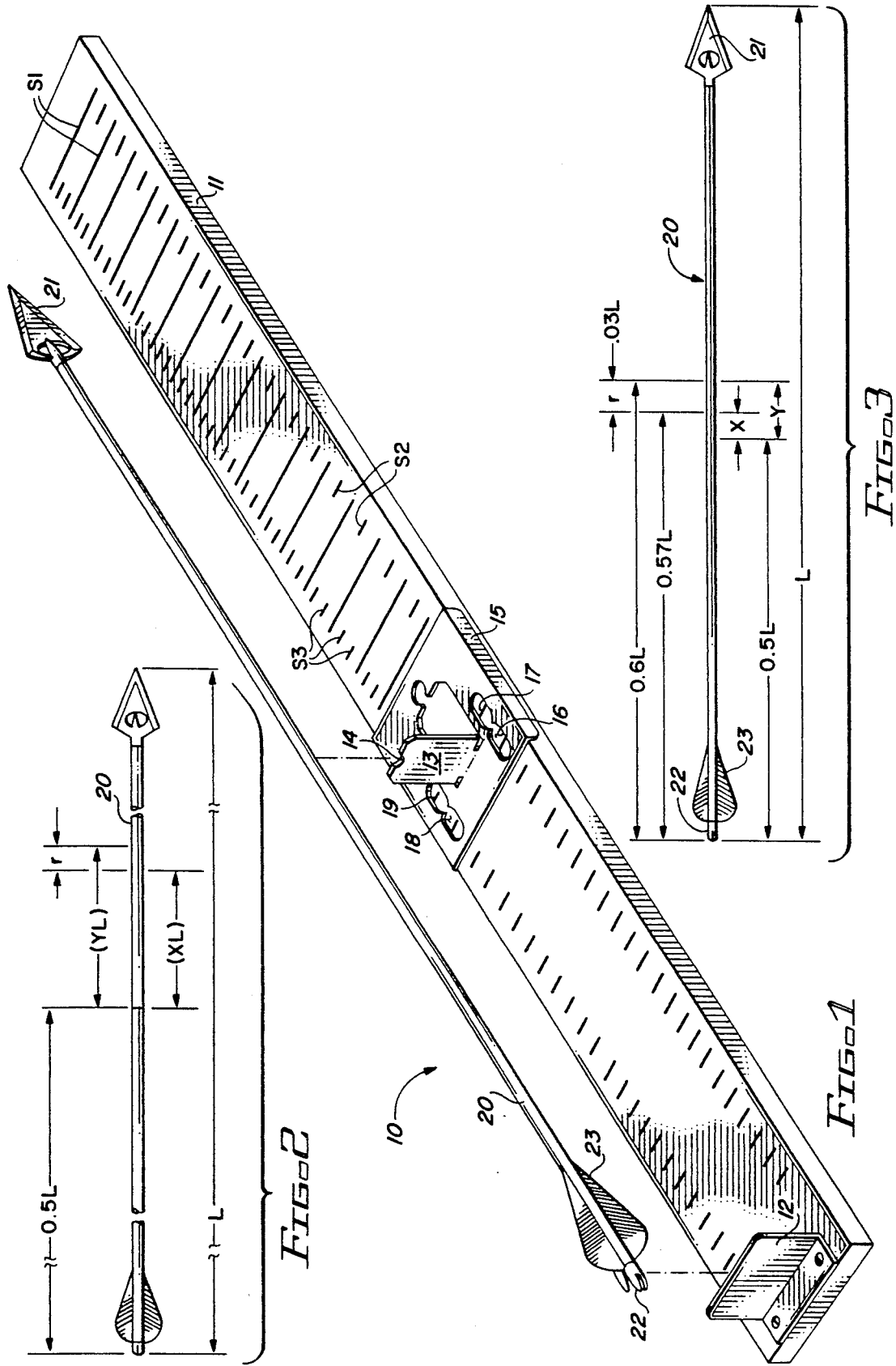

TOOL AND METHOD FOR ESTABLISHING AN ARROW'S BALANCE POINT

BACKGROUND

1. Technical Field of the Invention

The invention relates to the field of archery. In particular, the invention relates to means and method for establishing an optimum balance point for an arrow shaft so as to maximize the in-flight characteristics of the arrow.

2. Prior Background Art

Arrow shafts, in general, are equipped with replaceable arrowheads. There are many reasons for this, not the least of which is to permit the ready replacement of a damaged arrowhead while an archer is in the field. More frequently, an archer is prompted to change arrowheads when he changes the type of shooting with which he is involved. Thus, the archer may have been shooting at straw targets or the like, using standard arrow points, and decide to mount hunting heads on each of his arrow shafts so that he might partake of the hunt.

Assuming that the archer has been having success using an arrow point of a given weight, he will, in all likelihood, install a hunting head of the same weight. Having done so, it may come as a surprise to the archer to find that the flight of the arrow is erratic; and, the accuracy he has gained in practice with the arrow points on his shaft is no longer in evidence when shooting with hunting heads.

What the archer may not realize is that, although the overall weight of the arrow has not been changed by changing from the arrow point to a broad head hunting point, the overall geometry of the arrow may have been sufficiently changed to move the balance point enough to impair the flight characteristics of the arrow.

The balance point of the arrow is of critical importance. In tests of the accuracy of arrows, both actual and computer simulated testing, it has been shown that arrows are most accurate when they are seven to ten per cent nose heavy. While many archers are familiar with this rule, few of them understand how, exactly, it should be applied.

It is the objective of the present invention to enable an archer to correctly balance his arrow to bring its balance point within the established standards set by the manufacturers of the various arrow shafts and devices.

SUMMARY DESCRIPTION OF THE INVENTION

The invention may be summarized as a tool for establishing an arrow's balance point to produce optimal flight characteristics of the arrow per manufacturer's recommendations. These recommendations provide a range of optimal balance points at positions displaced from the midpoint of the arrow between X% and Y% of the arrow's length.

The tool itself is made up of a base having an arrow nock-end positioning reference thereon. First scale indicia, coupled to the base, represents (50%+X%) of the actual length of the arrows to be balanced. X, in turn, represents the displacement from midpoint of the arrow. X is further representative of a first bounding limit of a range of positions recommended by a given arrow's manufacturer.

Second scale indicia, coupled to the base, are representative of (50%+Y%) of the actual length of the arrows to be balanced. Y represents the displacement from midpoint of the arrow. Y is further representative of a second bounding limit of a range of positions recommended by a given arrow's manufacturer.

There is a fulcrum for balancing an arrow. The fulcrum is slide coupled to the base. A first index is coupled to the fulcrum for determining the position of the fulcrum with respect to the first scale indicia. Similarly, there is a second index coupled to the fulcrum for determining the position of the fulcrum with respect to the second scale indicia.

In a presently preferred embodiment, there are third scale indicia, coupled to the base, in units indicative of the actual length of arrows to be balanced on the tool. In accord with present manufacture recommendations, an embodiment of the invention is disclosed in which X% equals 7% and Y% equals 10%.

The disclosure also sets out a method for establishing an arrow's balance point to produce optimal flight characteristics. Use is made of a range of optimal balance points, at positions displaced from the midpoint of the arrow, between X% and Y% of the arrow's length.

The method includes the steps of preparing an arrow balancing tool. This is done by:

1) providing a base with an arrow nock-end positioning reference thereon;

2) imposing first scale indicia, coupled to the base, representative of (50%+X%) of the actual length of the arrows to be balanced, where X represents the displacement from midpoint of the arrow and is further representative of a first bounding limit of a range of positions recommended by a given arrow's manufacturer;

3) imposing second scale indicia, coupled to the base, representative of (50%+Y%) of the actual length of the arrows to be balanced, where Y represents the displacement from midpoint of the arrow and is further representative of a second bounding limit of a range of positions recommended by a given arrow's manufacturer;

4) providing a fulcrum for balancing an arrow thereon;

5) slidingly coupling the fulcrum to the base for determining the balance position of the arrow with respect to the first and the second scale indicia;

6) providing a first index coupled to the fulcrum for determining the position of the fulcrum with respect to the second scale indicia;

7) providing a second index coupled to the fulcrum for determining the position of the fulcrum with respect to the third scale indicia. And, finally, 8) using the arrow balancing tool to balance an arrow.

Provision of the tool may include the step of providing third scale indicia coupled to the base in units indicative of the actual length of arrows to be balanced on the tool.

The steps involved in using the tool include:

a) obtaining an arrow of selected length L to be balanced; positioning the nock-end of the arrow at the nock-end positioning reference;

b) placing the arrow, with the nock-end so positioned, on the fulcrum;

c) adjusting the fulcrum along the length of the arrow until the arrow, with the nock-end so positioned, balances on the fulcrum;

d) determining the position of the fulcrum with respect to the first and the second scales by observing the first index and the second index;

e) determining that the arrow is balanced if the fulcrum is positioned within the range bounded by indicia representing the selected arrow length L on the first scale and the selected arrow length L on the second scale, and f) determining the arrow to be unbalanced if the fulcrum is positioned outside the range.

The following steps are undertaken upon determining that the arrow is unbalanced.

(i) making the point-end of the arrow lighter relative to the nock-end of the arrow when the fulcrum is positioned outside the range toward the point-end of the arrow;

(ii) making the point-end of the arrow heavier relative to the nock-end of the arrow when the fulcrum is positioned outside the range toward the nock-end of the arrow; and (iii) repeating the earlier steps a-f set out above for using the tool.

The step of making the point-end of the arrow lighter relative to the nock-end comprises at least one of the following steps: Adding weight toward the nock-end of the arrow; and moving weight from the point-end of the arrow.

The point-end of the arrow may be made heavier relative to the nock-end by at least one of the following steps: moving weight from the nock-end of the arrow; and adding weight toward the point-end of the arrow.

Those practicing the method may preferably select X% to be 7% and Y% to be 10%. Claims are also laid to the arrow balancing tool which is produced by practicing the methodology disclosed.

BRIEF DESCRIPTION OF THE DRAWINGS

FIG. 1 is a perspective view of the arrow tuning device of the invention showing an arrow about the be positioned on for a determination of its balance point relative to the length of the arrow.

FIG. 2 illustrates, generally, the geometry discussed within the disclosure with reference to balance point along the length of an arrow shaft.

FIG. 3 further defines specific geometry relative to an arrow shaft to which flights and a broad head, hunting point are attached.

DETAILS OF BEST MODE FOR CARRYING OUT THE INVENTION

Figure 4:
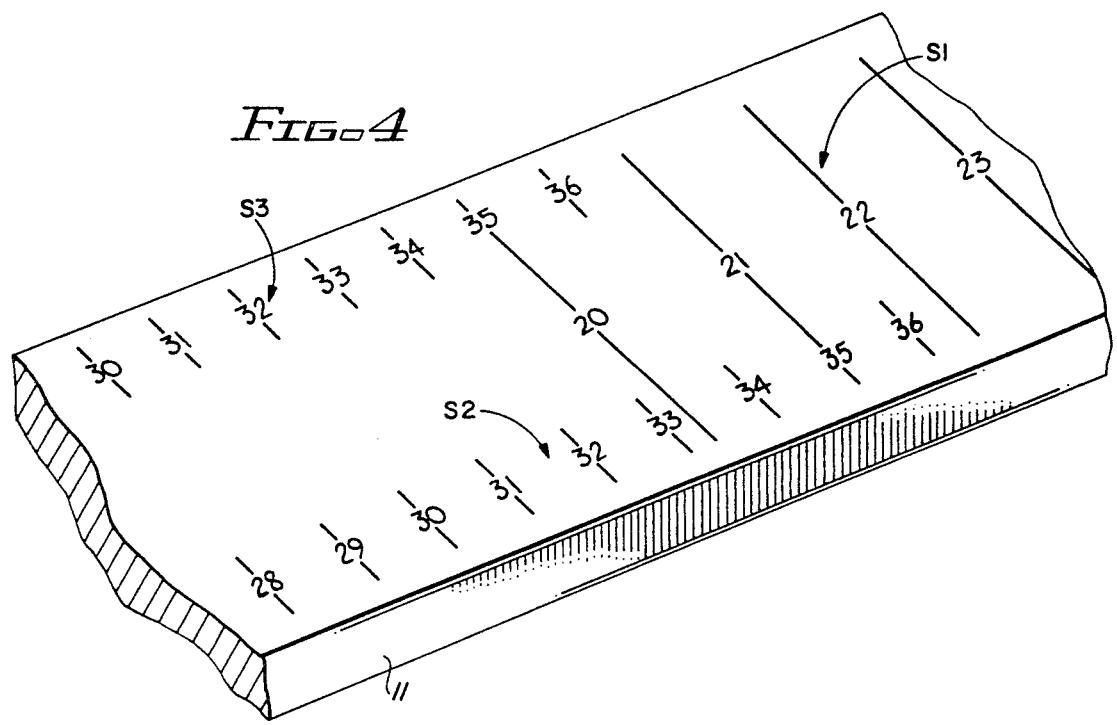
FIG. 4 is a detailed illustration of a portion of the scales presented on the arrow tuning device of FIG. 1.
Figure 5:
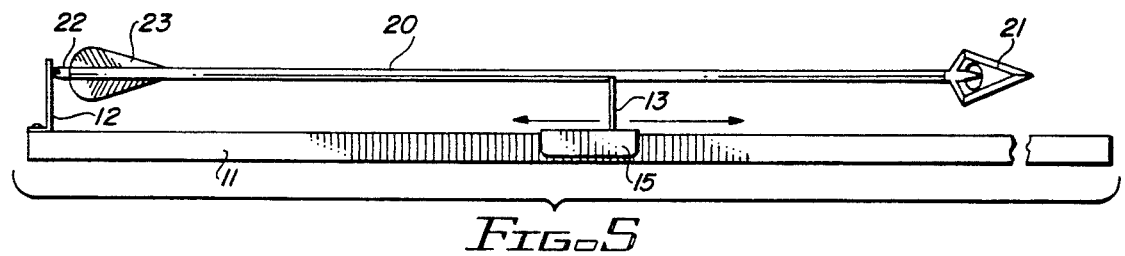
FIG. 5 is an elevation drawing showing an arrow positioned on the tuning device of FIG. 1.

For purposes of promoting an understanding of the principles of the invention, reference will now be made to the embodiments illustrated in the drawings and specific language will be used to describe same. It will nevertheless be understood that no limitation of the scope of the invention is thereby intended. Alterations and modifications of the illustrated device are contemplated, as are such further applications of the principles of the invention as would normally occur to one skilled in the art to which the invention pertains.

Arrow and equipment manufacturers are presently suggesting that, in order for the flight of an arrow to be accurate, the arrow should be between 7% and 10% nose heavy. To put this in other words, an arrow that is 7% nose heavy would balance at a point on the arrow shaft which is 57% of the overall length of the arrow, measured from the nock end of the arrow. An arrow that is 10% nose heavy would balance at a point which lies at 60% of the length of the arrow, measured again from the nock end of the arrow.

Further clarification of these numbers will be presented graphically in the drawings herein. Further, the reader should be aware that manufacturers are presently considering the establishment of new standards for optimum point of balance. Regardless of what that new standard may be, the teachings herein will be, and are, adaptable to meet that new standard or any which may come later. However, as a practical matter, the discussion here and the drawings provided will be with reference to the existing standard wherein the optimum balance point is located 7% to 10% in advance, that is towards the arrow point, of the mid-point of the arrow.

FIG. 1 illustrates the arrow tuning tool 10 to be used in optimizing the balance point on arrow 20. Tool 10 comprises a base 11 on which three scales, S1, S2, and S3 are imprinted. Scale S1 indicates the true length of the arrow with indicia marks indicative of that length in any selected, convenient, unit of measurement, e.g., inches or centimeters. The zero line for all scales begins where stop 12 is positioned on base 11.

Scale S3 bears indicia lines located at 57% of the length of the given arrow identified by a given indicia line. Scale S2 bears indicia lines located at 60% of the length of the arrow indicated by a given indicia line. This arrangement will be discussed in greater detail in the discussion of FIG. 4.

Returning now to FIG. 1, there is seen a slide 15 which is slidingly coupled to base 11. Slide 15 includes a fulcrum 13 having a notch 14 to accept the shaft of arrow 20. When arrow 20 is balanced in notch 14 on fulcrum 13, the position of the balance point on arrow 20, with respect to the overall length of arrow 20, will be generally indicated within windows 16 and 18 in slide 15 as points on scale S2 and S3. These points are indicated by the indices 17 and 19 in windows 16 and 18 respectively. Because of the different scaler values of scales S2 and S3, the indicia on each scale, for a given arrow length will be axially spaced apart by a range of balance points presently suggested by manufacturers to be 3% of the actual length of the arrow 20.

In the illustrations, arrow 20 is equipped with a broad head, hunting point 2!, has a nock 22 for engagement with a bow string, and is equipped with feathers or flights 23.

The geometry of interest here is shown is FIG. 2 wherein arrow 20 is assigned an overall length of L. The midpoint of the arrow is indicated a distance 0.5 L, shown measured from the nock end of the arrow. Manufacturers today prescribe that an arrow 20 should balance within a range r bounded by distances XL and YL forward of the midpoint of arrow 20.

The presently suggested actual values for establishing the balance point on an arrow of length L are shown in FIG. 3. These values are those presently assigned by arrow and equipment manufacturers. As before, arrow 20 is assigned an overall length L. The midpoint of the arrow is again indicated as 0.5 L. The suggested value of X is 7% of the length L. This balance point is indicated at 0.57 L (0.5 L+0.07 L) in the illustration of FIG. 3. The second bounding value Y is suggested at 10% of the length L. This suggested balance point is indicated in FIG. 3 at 0.6 L (0.5 L+0.1 L). The distance r, the range of balance points, is seen in FIG. 3 to be 0.03 L. Manufacturers suggest that an arrow shall balance within the range r for optimum flight characteristics.

Should an archer change his nock 22, his flights 23, and/or his arrow point 21, the overall length of arrow 20, may, possibly, remain the same. However, in all likelihood, the balance point will change. By use of tool 10, and judicious manipulation of the various elements making up the arrow, i.e. the point, flights, and nock, the arrow may be brought to balance once more within its optimum range r.

As promised earlier, a more thorough discussion of the three scales, S1, S2, S3, will now be undertaken. FIG. 4 illustrates a section of base 11 presenting an unimpeded view of a portion of the three scales imposed on the face of base 11.

Scale S1, showing the indicia 20 through 23, represents the actual overall lengths, in inches, of an arrow of those indicated dimensions.

Scale S2 is imprinted with indicia 28 through 36 which are representative of arrows of those indicated lengths but which, in fact, are imprinted at positions actually located at 60% of the indicated lengths. Similarly, scale S3, with indicia indicating arrow lengths of 30 through 36 inches, represents arrows of those given lengths. But the indicia are imprinted on the face of base 11 at positions which in actuality are only equivalent to 57% of the indicated lengths.

Some actual measurements will now be considered. All measurements with the tool are taken from the face of backstop 12. When an arrow 20 has its nock end placed against stop 12, its point will lie above the value on scale S1 which indicates the true overall length of the arrow. Assume that arrow length is 31 inches.

Scale S2 sets out indicia representative of 60% of the overall length of the arrow being balanced. In this instance, at a distance equivalent to 18.6 inches from backstop 12, an indicia line on scale S2 will be represented by the numeral 31. The distance, 18.6 inches, is equivalent to 60% of the overall arrow length, 31 inches. Further, 18.6 inches is 3.1 inches forward of the midpoint of an arrow whose actual length is 31 inches. 3.1 inches is 10% of the overall length of the arrow and represents a first end of the range of preferred balance points for the arrow as suggested by manufacturers.

With respect to scale S3, the indicia lines there represent a length, equivalent to 57% of the length of the arrow indicated. Therefore, the indicia 31, representative of an arrow thirty-one inches in length, will be placed 17.6 inches away from backstop 12. This position is 2.17 inches forward of the center point of the 31 inch arrow. This position is therefore 7% removed from the midpoint of the arrow, this being a second end of the range of preferred boundary limits of the balance points as suggested by manufacturers.

It should be noted that these scales, S2 and S3, can be established to define a range of balance points which falls at other than 57% to 60% of the overall length of the arrow when measured from the nock. Scales S2 and S3 may be established indicative of balance points on either side of the midpoint of the arrow (i.e. X and/or Y having negative values), and with any recommended range of values between those balance points.

In using tool 10, an arrow 20 is positioned with its nock end 22 in contact with backstop 12. The shaft rests in notch 14 on fulcrum 13. A slight tap on base 11 or stop 12 will release an frictional contact between nock 22 and stop 12 so that arrow 20 is free to pivot about fulcrum 13.

Should flights 23 move downward toward base 11, moving arrow point 21 upwards away from base 11, slide 15 is moved to the rear, toward nock 22 of arrow 20. Again, the base 11 or stop 12 is lightly tapped to release frictional contact between nock 22 and stop 12.

The balance of the arrow is again tested. Slide 15 is adjusted to move fulcrum 13 toward the end of the arrow which drops downward toward base 11. Attempts are repeated until the arrow balances on fulcrum 13. Readings of scales S2 and S3 are then made to determine if the arrow 20 is balancing within the optimal range suggested by arrow and equipment manufacturers.

Figure 6:
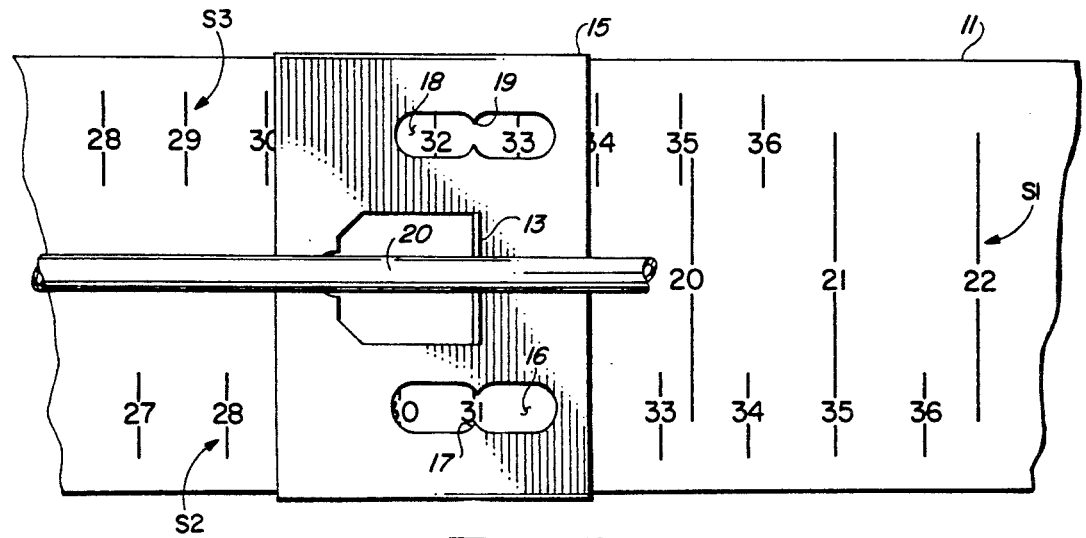
FIG. 6 is a plan view of a portion of the tuning device showing an arrow balanced on the arrow rest and the windows in the base of the arrow rest through which a determination of the balance point, in relation to the overall length of the arrow, is indicated.

Assume again that arrow 20 is 31 inches in overall length. FIG. 6 represents a plan view of the tool with arrow 20 balanced on fulcrum 13. The optimum balance point for arrow 20 falls between the position indicated by 31 on scale S3 and 31 on scale S2. In the illustration of FIG. 6, index 19 of window 18 indicates the arrow is balancing at a point indicated as greater than 31 on scale S3. At the same time, index 17 of window 16 rests at a point indicated as 31 on scale S2. Thus the arrow balance point is within the recommended optimum range, but lies exactly at one limiting position in that range: 31 on scale S2.

In other words, in window 16 on slide 15, the numeral 31 appears at index 17. This indicates that arrow 20 is balancing at a point 10% removed from the midpoint of arrow 20 toward arrow point 21. That is, arrow 20 is nose heavy, as is recommended, and has its balance point displaced 10% toward the broad head hunting point 21. The 10% nose heavy position represents a limiting extreme within the range 7% to 10% suggested by manufacturers.

The archer may choose to leave the arrow assembly as it is since it falls within the range of values suggested. Alternatively, the archer may wish to remove a small amount of weight away from the nose of the arrow (or add a bit toward the nock end of the arrow) to draw the balance point away from the limiting boundary of the suggested balance range.

If the indicia presented at index 19 of window 18 had read 31, then the arrow would have had its balancing position 7% in advance of the midpoint of the arrow, which position is at the other extreme of the suggested range for optimum balance. In this case, the archer might choose to shoot the arrow in its present configuration or slightly adjust its weight elements to move the balance point slightly toward the nose of the arrow.

If the reading at index 17 of window 16 exceeded the number 31, the balance position of arrow 20 would be too close to tip 21. This means that arrow 20 would be too nose heavy. Compensation would be achieved by increasing the weight of the fletching or reducing the weight of the arrowhead.

If the reading at index 19 of window 18 were to be less than the numeral 31, the balance position of arrow 20 would fall too close to the fletching end of the arrow. The fletching would be lightened or moved, or a new nose end selected to bring the arrow balance within the optimal range.

As earlier noted the optimal range, per present arrow manufacturer instructions, would fall between the index 31 on scale S3 and the index 31 on scale S2.

What has been disclosed is an arrow balancing tool to be used in establishing the range of optimal balance points on an arrow to produce the most efficient flight characteristics in accord with manufacturer recommendations. Assuming that the optimal balance point will fall toward the nose end of the arrow, approximately 7 to 10% of the arrow length removed from the midpoint of the arrow, the invention provides a base with a scale graduated in units equivalent to 57% of the length of the arrows being balanced. A second scale is graduated in units representative of 60% of the lengths of the various arrows to be balanced. A reference point, zero on the various scales, is established at which the nock of the arrow is positioned. A fulcrum, slidingly coupled to the tool, is adjusted until the balance point of the arrow is determined. Indices on the sliding fulcrum are positioned for a readout on each of the scales. When balancing of the arrow places the fulcrum in a position between the indexed length of the arrow on a first one of the scales and the indexed length of the arrow on the second one of the scales, the balance position on the arrow shaft will be within the established, optimal range. Actual scale unit values will reflect current manufacturer recommendations for optimal balance of an arrow.

Those skilled in the art will conceive of other embodiments of the invention which may be drawn from the disclosure herein. To the extent that such other embodiments are so drawn, it is intended that they shall fall within the ambit of protection provided by the claims herein.

Having described the invention in the foregoing description and drawings in such clear and concise manner that those skilled in the art may readily understand and practice the invention, That which is claimed is:

1. A tool for establishing an arrow's balance point to produce optimal flight characteristics of the arrow per manufacturer's recommendations, wherein a range of optimal balance points at positions displaced from the midpoint of the arrow between X% and Y% of the arrow's length is recommended, said tool comprising;
    a base having an arrow nock-end positioning reference thereon;
    first scale indicia, coupled to said base, representative of (50%+X%) of the actual length of the arrows to be balanced, where X represents the displacement from midpoint of the arrow and is further representative of a first bounding limit of a range of positions recommended by a given arrow manufacturer;
    second scale indicia, coupled to said base, representative of (50%+Y%) of the actual length of the arrows to be balanced, where Y represents the displacement from midpoint of the arrow and is further representative of a second bounding limit of a range of positions recommended by a given arrow manufacturer;
    a fulcrum for balancing an arrow thereon, said fulcrum being slidingly coupled to said base for determining the balance position of said arrow with respect to said first and said second scale indicia;
    a first index coupled to said fulcrum for determining the position of said fulcrum with respect to said first scale indicia; and
    a second index coupled to said fulcrum for determining the position of said fulcrum with respect to said second scale indicia.

2. The tool of claim 1 further comprising third scale indicia coupled to said base in units indicative of the actual length of arrows to be balanced on said tool.

3. The tool of claim 1 wherein X% equals 7% and Y% equals 10%.

4. A method for establishing an arrow's balance point to produce optimal flight characteristics of an arrow per manufacturer's recommendations, wherein a range of optimal balance points at positions displaced from the midpoint of the arrow between X% and Y% of the arrow's length is recommended, said method comprising the steps of:
    A) producing an arrow balancing tool by:
    providing a base with an arrow nock-end positioning reference thereon;
    imposing first scale indicia, coupled to said base, representative of (50%+X%) of the actual length of the arrows to be balanced, where X represents the displacement from midpoint of the arrow and is further representative of a first bounding limit of a range of positions recommended by a given arrow manufacturer;
    imposing second scale indicia, coupled to said base, representative of (50%+Y%) of the actual length of the arrows to be balanced, where Y represents the displacement from midpoint of the arrow and is further representative of a second bounding limit of a range of positions recommended by a given arrow manufacturer;
    providing a fulcrum for balancing an arrow thereon;
    slidingly coupling said fulcrum to said base for determining the balance position of said arrow with respect to said first and said second scale indicia;
    providing a first index coupled to said fulcrum for determining the position of said fulcrum with respect to said first scale indicia;
    providing a second index coupled to said fulcrum for determining the position of said fulcrum with respect to said second scale indicia; and
    B) using said arrow balancing tool to balance an arrow.

5. The method of claim 4 wherein step A includes the step of providing third scale indicia coupled to said base in units indicative of the actual length of arrows to be balanced on said tool.

6. The method of claim 4 wherein step B includes the followings steps:
    obtaining an arrow of selected length L to be balanced; positioning the nock-end of said arrow at said nock-end positioning reference;
    placing said arrow, with said nock-end so positioned, on said fulcrum;
    adjusting said fulcrum along the length of said arrow until said arrow, with said nock-end so positioned, balances on said fulcrum;
    determining the position of said fulcrum with respect to said first and said second scales by observing said first index and said second index;
    determining that said arrow is balanced if said fulcrum is positioned within the range bounded by indicia representing said selected arrow length L on said first scale and said selected arrow length L on said second scale, and determining that said arrow is unbalanced if said fulcrum is positioned outside said range.

7. The method of claim 6 further comprising the following steps upon determining that said arrow is unbalanced;

making the point-end of said arrow lighter relative to the nock-end of said arrow when said fulcrum is positioned outside said range toward the point-end of said arrow;

making the point-end of said arrow heavier relative to the nock-end of said arrow when said fulcrum is positioned outside said range toward the nock-end of said arrow; and repeating the steps of claim 6.

8. The method of claim 7 wherein the step of making the point-end of said arrow lighter relative to said nock-end comprises at least one of the following steps;

adding weight toward said nock-end of said arrow; and moving weight away from said point-end of said arrow.

9. The method of claim 7 wherein the step of making the point-end of said arrow heavier relative to said nock-end comprises at least one of the following steps;

moving weight away from said nock-end of said arrow; and adding weight toward said point-end of said arrow.

10. The method of claim 4 including the steps of selecting X% to be 7% and selecting Y% to be 10%.

11. The method of claim 6 including the steps of selecting X% to be 7% and selecting Y% to be 10%.

12. The method of claim 7 including the steps of selecting X% to be 7% and selecting Y% to be 10%.

13. The arrow balancing tool produced by practice of the method of claim 4.

14. The arrow balancing tool produced by practice of the method of claim 5.

* * * * *